United States Patent [19]
Patti

[11] Patent Number: 4,961,611
[45] Date of Patent: Oct. 9, 1990

[54] VEHICLE WHEEL COVER

[76] Inventor: Anthony J. Patti, 27610 Fairview Avenue, Hayward, Calif. 94542

[21] Appl. No.: 306,057

[22] Filed: Feb. 6, 1989

[51] Int. Cl.⁵ .............................................. B60B 7/04
[52] U.S. Cl. .......................... 301/37 SC; 301/108 SC; 301/37 AT
[58] Field of Search .......... 301/37 R, 37 CM, 37 AT, 301/37 SS, 37 SC, 108 R, 108 SC

[56] References Cited

U.S. PATENT DOCUMENTS

| | | | |
|---|---|---|---|
| 2,650,862 | 9/1953 | Lyon | 301/37 CM |
| 4,447,091 | 5/1984 | Nguyen et al. | 301/37 AT |
| 4,452,493 | 6/1984 | Liggett | 301/37 SS |
| 4,699,434 | 10/1987 | Hempelmann | 301/37 SS |
| 4,818,032 | 4/1989 | Thomas | 301/37 CM X |

FOREIGN PATENT DOCUMENTS 2174043 10/1986 United Kingdom ............ 301/37 R

*Primary Examiner*—Russell D. Stormer
*Attorney, Agent, or Firm*—Linval B. Castle

[57] ABSTRACT

Ornamental auto wheels mounted with conventional lug bolts or nuts and designed to be used without wheel covers are provided with ornamental wheel covers that cover only the lugs and hub area to discourage theft of the wheels. The end of a threaded shaft is attached to the center of an elongated bar which may pass through the hub hole at an angle and which is axially locked in the hub hole and against the rear surface of the wheel by a front plate screwed onto the shaft. The wheel cover to be mounted has a flanged tubular shaped nut retaining cup which has a central hole that will pass only the smaller diameter of two diameters of a locking nut which is threaded onto the shaft to secure the wheel cover to the wheel. The larger outer end of the nut closely fits within the larger diameter of the retaining cup, the outwardly extending flange of which prevents its passage through the wheel cover. The exterior end surface of the locking nut is "keyed" with holes spaced to fit pegs of a special spanner for removal of the nuts and the close spacing between the nut surface and the retain cup prevents removal by pliers or other normal tools.

3 Claims, 1 Drawing Sheet

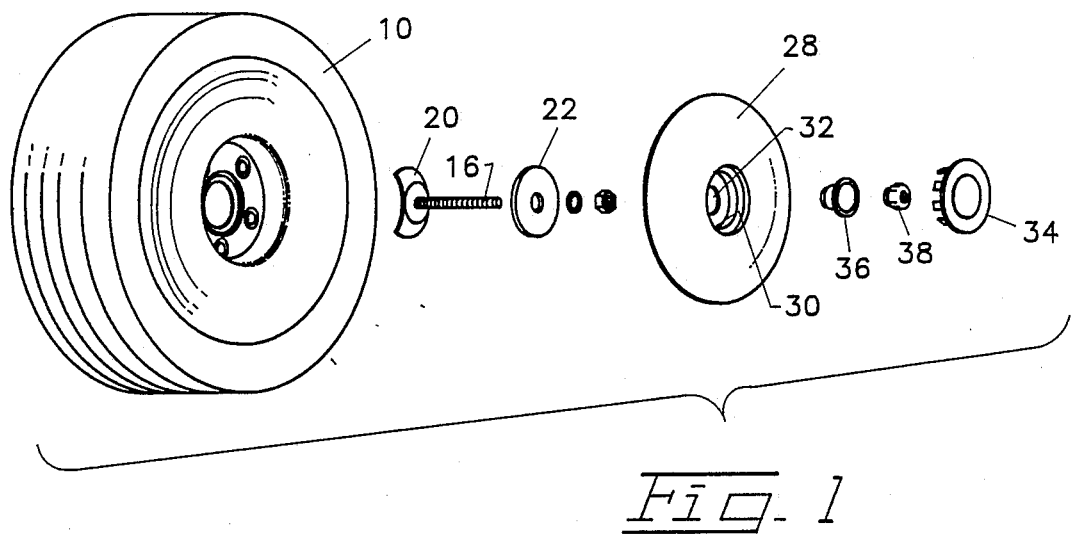
Fig. 1
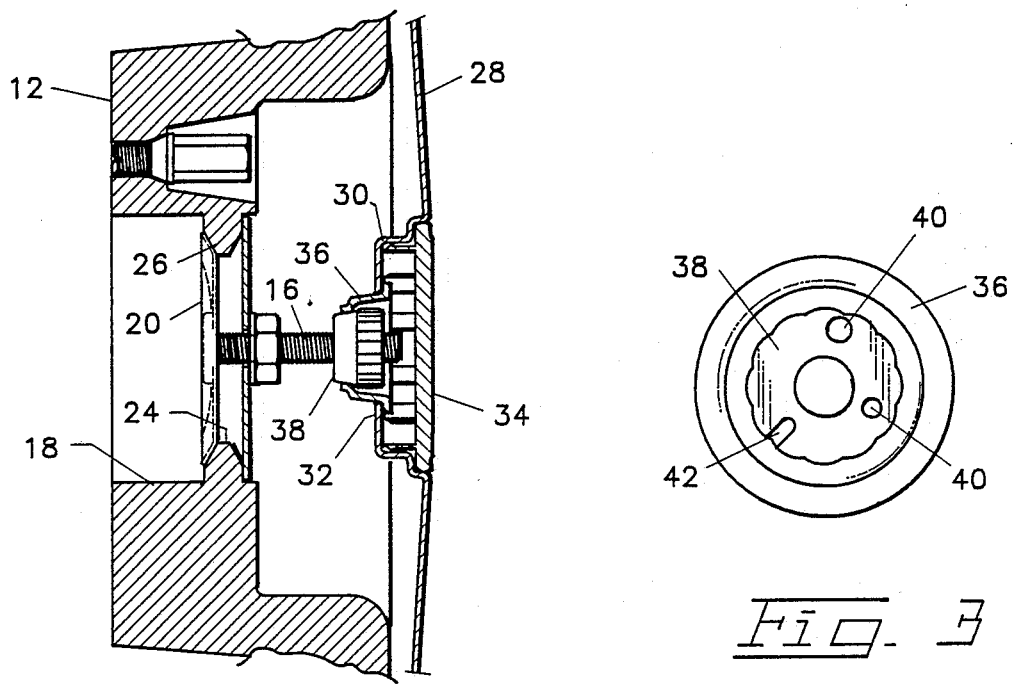
Fig. 2
Fig. 3

4,961,611

VEHICLE WHEEL COVER

BRIEF SUMMARY OF THE INVENTION

This invention relates to ornamental wheel covers for motor vehicles and in particular to an improved safety wheel cover for securing a vehicle wheel against theft.

Many modern automobiles do not use separate wheel covers and have costly ornamental wheels with exposed chromed mounting lugs as a part of the ornamentation. Very often one of more of the lug nuts on each wheel are special locking types requiring a separate key to prevent unauthorized removal of the nut. While such a locking nut might provide a degree of safety against the theft of a set of expensive wheels and tires, there is often some objection to their use because of a danger of loss of the locking key and of the general appearance of an ornamental wheel with a mismatching lug nut.

The invention to be described provides for the mounting of a wheel cover that preserves the design features of the ornamental wheel but which covers the lug and central hub opening of the wheel while still providing a locking feature and a pleasing ornamental appearance. The mounting may be used with vehicle mounted wheels or on exterior mounted spare tire wheels.

The invention to be described is for a mounting for attaching an ornamental wheel cover to the uncovered central portion of a wheel that is attached via the wheel lug bolts to the vehicle wheel. The wheel cover encloses the entire central portion of the wheel including the wheel lug bolts and wheel hub opening after removal of the usual emblem cap or disc therefrom. The lug cover is attached to the wheel by a shaft axially extending from the wheel hub opening and is secured to the shaft by a key rotated threaded locking nut that discourages theft. An ornamental central emblem cap covers the end of the shaft and nut so that the wheel cover covers only the wheel lug nuts and hub portion and so that no wheel removal means is apparent.

BRIEF DESCRIPTION OF THE DRAWINGS

In the drawings which illustrate the preferred embodiment of the invention:

FIG. 1 is a perspective view illustrating a wheel and the components forming the wheel cover mounting;

FIG. 2 is a sectional elevational view of a wheel with an ornamental wheel cover attached thereto; and FIG. 3 is an end view of the locking nut with random key holes therein.

DETAILED DESCRIPTION

Illustrated in the perspective drawing of FIG. 1 is a tire 10 mounted on its wheel 12 secured to a vehicle by conventional lug bolts 14, as shown in FIG. 2. With the wheel thus secured, a lug covering wheel cover is attached to a threaded shaft 16 which is tightly secured through and on the axis of the wheel hub hole 18.

The axial installation of the shaft 16 is best accomplished by clamping the edges of the wheel axle hub hole 18 between an inner plate 20 and outer plate 22. One end of the shaft is attached to the center of the inner plate 20, passes through a central hole in the outer plate 22 and the shaft 16 is secured in a position normal to the plane of the wheel by clamping the plates together with a lock washer and threaded nut. As shown in FIG. 2, the wheel 12 is a heavy duty cast wheel, such as a magnesium wheel, and the large central hub hole contains a coaxial centering ring 24 to which the plates 20, 22 are clamped.

Since the threaded shaft 16 must be capable of being attached on a vehicle mounted wheel 12, the inner plate 20 must be insertable through through the central hub hole 18 from the exterior of the wheel. Thus, the inner plate 20 bar shaped and is preferably formed from the center section of a disc or from a truncated conical section as shown in FIG. 2. The length of this inner plate bar must be longer than the diameter of the hub hole 18 and the bar width must be narrower than the hole diameter. In this form, the inner plate 20 may be attached to the end of the threaded shaft 16 and easily inserted from the outer side of the wheel without removing the wheel from the vehicle. The conical edge 26 assures its self-centering in the wheel hub hole 18.

The wheel cover illustrated in the drawings is a slightly convex disc 28 with a center cup 30 having a central mounting hole 32 and a center spring-locked emblem disc 34 and is commonly referred to in the automotive trade as a "Vette Disc". Any other type of ornamental wheel cover may be used but must be one which is mounted to its wheel through a central hole. The center cup 30 and emblem disc 34 are ornamental and are not required components of the invention.

Into the central hole 32 of the wheel cover disc 28 is inserted a nut retaining cup 36 that has a central bottom hole in a small diameter bottom section and a top edge flange extending from the larger diameter main body section. The flange will prevent passage of the retaining cup through the central mounting hole 32 in the wheel cover disc 28. The disc 28 with retaining cup 36 inserted through the central mounting hole 32 is then passed over the end of the threaded shaft 16 and a keyed locking nut 38 is screwed on the shaft end and tightened to secure the wheel cover disc 28 to the rod and against the wheel 12.

FIG. 3 illustrates the outer end of a typical keyed locking nut 38 as used in the invention. The end is smooth with no normal means for grasping the nut. Thus, there is no convenient means for removing a tightened nut and for a theft of the tire. Randomly bored in the smooth end of the locking nut are at least two surface holes 40 or edge holes 42, or any combination of surface and edge holes, into which is inserted a small spanner wrench having peg keys appropriately located to engage the holes. Additional holes in the smooth surface may be provided for "master keys".

A side view of the locking nut 38 is shown in FIG. 2 and comprises a smooth surfaced tubular bottom section which provides a bearing surface which passes through the central mounting hole 32 in the wheel disc. Between the smooth tubular bottom surface and the top end surface of the nut 38 is a tubular section of a larger diameter that cannot pass through the central mounting hole 32. This larger diameter is only slightly smaller than the inside diameter of the larger diameter main body section of the retaining cup 34 so that a tightened nut can only be turned with the spanner wrench and not by a screw driver or wrench.

As illustrated in FIG. 2, after installing the wheel cover disc 28 and securing it to the threaded shaft 16 with a nut such as the locking nut 38, the nut and shaft end are covered by snapping the spring locked emblem disc 34 into the center cup 30 to present a smooth ormental disc surface that covers the center of the spare tire and wheel with no apparent means for removal of the wheel disc or the spare tire from the vehicle spare tire rack.

Having thus described my invention, what I claim follows.

1. A wheel cover mounting for a vehicle wheel having lug mounting means and a central hub opening, said wheel cover mounting comprising:

a threaded shaft extending axially outward from the center of the wheel hub opening, one end of said shaft secured to an elongated inner plate having a length larger than the diameter of the central hub opening and a width narrower than said diameter, said inner plate being positioned against the inner surface of said wheel;

an outer plate having a centrally located shaft clearance opening and positioned against the exterior surface of said wheel;

means for clamping together said inner and outer plates against said wheel;

a threaded locking nut for engaging said threaded shaft, said locking nut having a smooth, cylindrical, exterior, first surface of a first diameter adjacent an end facing said wheel and a cylindrical second surface of a second diameter between said first surface and an end distal of said wheel, said second diameter being larger than said first diameter;

a nut retaining cup having first and second ends, the first end having a central axial hole, the diameter of said hole permitting passage and rotation of the first diameter of said threaded locking nut and preventing passage therethrough of said second diameter of said nut, the second end of said retaining cup having a cylindrical inner surface closely adjacent the cylindrical second surface of said threaded locking nut and an outwardly extending flange; and a wheel cover having a central hole having a diameter corresponding to the diameter of the exterior of the second end of said nut retaining cup and less than the diameter of the outwardly extending flange on said retaining cup.

2. The wheel cover mounting claimed in claim 1 wherein the end surface of said threaded locking nut adjacent its second surface is keyed with at least two spaced surface holes, the spacing of said surface holes corresponding to the spacing of pegs on a special spanner wrench.

3. The wheel cover mounting claimed in claim 2 further including a spring mounted emblem disc attachable to the center exterior of said wheel cover, said disc covering the normally exposed ends of said threaded shaft, said threaded locking nut and said nut retaining cup.

* * * * *